United States Patent
Barre et al.

(10) Patent No.: US 10,406,767 B2
(45) Date of Patent: *Sep. 10, 2019

(54) CASTING CUP ASSEMBLY FOR FORMING AN OPHTHALMIC DEVICE

(71) Applicant: Johnson & Johnson Vision Care, Inc., Jacksonville, FL (US)

(72) Inventors: Vincent H. Barre, Jacksonville, FL (US); Scott F. Ansell, Jacksonville, FL (US); Gregory L. Berckmiller, St. Johns, FL (US); Timothy Burkill, Limerick (IE); Mark McConnell, Limerick (IE)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 427 days.

This patent is subject to a terminal disclaimer.

(21) Appl. No.: 15/166,472

(22) Filed: May 27, 2016

(65) Prior Publication Data
US 2016/0271893 A1    Sep. 22, 2016

Related U.S. Application Data

(63) Continuation of application No. 13/763,345, filed on Feb. 8, 2013, now Pat. No. 9,352,493.

(51) Int. Cl.
*B29D 11/00* (2006.01)
*B29C 33/30* (2006.01)
(Continued)

(52) U.S. Cl.
CPC .......... *B29D 11/00038* (2013.01); *B23B 1/00* (2013.01); *B29C 33/303* (2013.01);
(Continued)

(58) Field of Classification Search
CPC ..... B29C 33/42; B29C 39/026; B29C 39/028; B29C 33/303; B29C 33/3842;
(Continued)

(56) References Cited

U.S. PATENT DOCUMENTS

| 4,815,690 A | 3/1989 | Shepherd |
| 4,955,580 A | 9/1990 | Seden et al. |

(Continued)

FOREIGN PATENT DOCUMENTS

| DE | 19727671 A1 | 1/1999 |
| EP | 1529625 A1 | 5/2005 |

(Continued)

OTHER PUBLICATIONS

Extended European Search Report, dated May 7, 2014, for EP14154522.8.
Translation of JP 05-337957.

*Primary Examiner* — Joseph S Del Sole
*Assistant Examiner* — Emmanuel S Luk (57) ABSTRACT

Disclosed in this specification is a casting cup assembly comprising frontcurve and basecurve molds which of which includes a ring that circumscribes the respective concave and convex mold surface. When the casting cup is assembled, the rings align and minimize de-centering and tilting of the concave and convex mold surfaces which, in turn, reduces edge defects.

6 Claims, 8 Drawing Sheets

(51) Int. Cl.
  *B29C 33/38* (2006.01)
  *B23B 1/00* (2006.01)
  *B29C 33/42* (2006.01)
  *B29L 11/00* (2006.01)

(52) U.S. Cl.
  CPC .......... *B29C 33/3842* (2013.01); *B29C 33/42* (2013.01); *B29D 11/005* (2013.01); *B29D 11/0048* (2013.01); *B29L 2011/0041* (2013.01); *Y10T 82/10* (2015.01)

(58) Field of Classification Search
  CPC ........... B29D 11/00038; B29D 11/005; B29D 11/0048; B23B 1/00
  See application file for complete search history.

(56) References Cited

U.S. PATENT DOCUMENTS

| | | |
|---|---|---|
| 4,985,186 A | 1/1991 | Nose et al. |
| 5,252,056 A | 10/1993 | Horner et al. |
| 5,254,000 A | 10/1993 | Friske et al. |
| 5,620,720 A | 4/1997 | Glick et al. |
| 5,759,318 A | 6/1998 | Galas |
| 5,861,114 A | 1/1999 | Roffman et al. |
| 5,975,875 A | 11/1999 | Crowe, Jr. et al. |
| 6,071,111 A | 6/2000 | Doke et al. |
| 6,158,861 A * | 12/2000 | Oyama ............ B29D 11/00038 264/2.2 |
| 6,276,920 B1 | 8/2001 | Doke et al. |
| 6,405,993 B1 | 6/2002 | Morris |
| 6,444,145 B1 | 9/2002 | Clutterbuck |
| 6,475,410 B1 | 11/2002 | Nakagawa |
| 6,592,356 B1 | 7/2003 | Lust et al. |
| 6,827,885 B2 | 12/2004 | Altmann et al. |
| 6,869,549 B2 | 3/2005 | Ansell et al. |
| 6,997,428 B1 | 2/2006 | Andino et al. |
| 7,156,641 B2 | 1/2007 | Ansell et al. |
| 7,581,943 B2 | 9/2009 | Goodenough et al. |
| 7,731,873 B2 | 6/2010 | Darnton et al. |
| 7,736,552 B2 * | 6/2010 | Kimura ................ B23B 1/00 264/1.32 |
| 7,762,165 B2 * | 7/2010 | Kimura ................ B24B 13/01 82/1.11 |
| 7,850,878 B2 | 12/2010 | Lawton et al. |
| 9,352,493 B2 | 5/2016 | Barre et al. |
| 2003/0232578 A1* | 12/2003 | Hayashi ................ B23B 5/40 451/41 |
| 2004/0075182 A1 | 4/2004 | Gobron |
| 2004/0113299 A1* | 6/2004 | Hosoe ................ B24B 13/046 264/2.5 |
| 2004/0173921 A1 | 9/2004 | Furuta et al. |
| 2005/0100631 A1 | 5/2005 | Baba et al. |
| 2005/0128432 A1* | 6/2005 | Altmann ............. G02C 7/042 351/159.41 |
| 2005/0212155 A1 | 9/2005 | Matsuzawa et al. |
| 2006/0006558 A1 | 1/2006 | Yamada |
| 2006/0065998 A1 | 3/2006 | Takigawa |
| 2007/0159593 A1* | 7/2007 | Hibino .................. G02C 7/04 351/159.08 |
| 2007/0296096 A1 | 12/2007 | Bruce et al. |
| 2008/0054505 A1 | 3/2008 | Yao et al. |
| 2008/0121078 A1* | 5/2008 | Kunimatsu ............ B23B 1/00 83/13 |
| 2009/0166507 A1 | 7/2009 | Lawton et al. |
| 2009/0303432 A1* | 12/2009 | Suzuki ............. B29D 11/00125 351/159.02 |
| 2010/0109176 A1 | 5/2010 | Davison |
| 2013/0169926 A1* | 7/2013 | Goodenough ........... G02C 7/04 351/159.33 |
| 2013/0313404 A1 | 11/2013 | Katterhenry et al. |
| 2014/0226123 A1 | 8/2014 | Barre et al. |
| 2014/0252667 A1 | 9/2014 | Van Dijk et al. |
| 2015/0084218 A1* | 3/2015 | Ezekiel ................ G02C 7/043 264/2.5 |
| 2015/0174663 A1* | 6/2015 | Liu ........................... B23B 5/36 82/1.11 |
| 2015/0224579 A1* | 8/2015 | Matsuda ................. B23B 1/00 82/1.11 |
| 2016/0077244 A1* | 3/2016 | Saito ....................... G02B 3/08 362/311.06 |
| 2016/0129650 A1* | 5/2016 | Leone .................. B23B 31/307 264/2.5 |
| 2016/0144534 A1* | 5/2016 | Liu ......................... B29C 33/38 264/1.36 |
| 2017/0001390 A1* | 1/2017 | Miller ................ B29D 11/0048 |

FOREIGN PATENT DOCUMENTS

| | | |
|---|---|---|
| EP | 1561560 A1 | 8/2005 |
| EP | 2181836 A1 | 5/2010 |
| GB | 2230730 A | 10/1990 |
| JP | 5337957 A | 12/1993 |
| WO | WO 2005054931 A1 | 6/2005 |
| WO | WO 2008149404 A1 | 12/2008 |
| WO | WO 2011122201 A1 | 10/2011 |

* cited by examiner

FIG. 1A

PRIOR ART

FIG. 1B

PRIOR ART

CASTING CUP ASSEMBLY FOR FORMING AN OPHTHALMIC DEVICE

CROSS-REFERENCE TO RELATED APPLICATION

This application is a continuation of U.S. application Ser. No. 13/763,345, filed Feb. 13, 2013, which issued May 31, 2016, as U.S. Pat. No. 9,352,493, the contents of which are incorporated by reference herein.

FIELD OF THE INVENTION

This invention relates, in one embodiment, to a casting cup assembly for forming ophthalmic devices such as contact lenses.

BACKGROUND

Many ophthalmic devices, including contact lenses, surgical lenses, intraocular lenses, and the like, are often made by performing a polymerization reaction within a casting cup assembly. The casting cup assembly includes a basecurve mold, which forms the portion of the device that rests against the eye, and a frontcurve mold, which forms the portion of the device facing away from the eye. A reaction mixture, which includes one or more polymerizable monomers and other components, is disposed in the frontcurve mold. Thereafter, the basecurve mold is pressed against the frontcurve mold and the reaction mixture is forced to adopt the shape of the volume defined between the two molds. After properly being positioned, the reaction mixture is subjected to polymerization conditions (e.g. photopolymerization or other suitable technique). The resulting polymer is removed from the casting cup assembly and subjected to post-polymerization processing (e.g. rinsing, hydration, etc) to provide a finished ophthalmic device. During this post-polymerization processing, careful inspection of the lenses often reveals a substantial number of the lenses contain defects.

Defects include a variety of fabrication errors such as holes in the lenses, tears in the edges, the presence rings of excess polymer around the ophthalmic device, and other similar defects. Therefore, an improved method for providing ophthalmic devices is desired that reduces the occurrence of these defects.

SUMMARY OF THE INVENTION

Disclosed in this specification is a casting cup assembly comprising precision manufactured frontcurve and basecurve molds which include a ring that circumscribes the respective concave and convex mold surface. When the casting cup is assembled, the rings align with high precision and prevent de-centering and tilting of the concave and convex mold surfaces which, in turn, reduces edge defects.

An advantage that may be realized in the practice of some disclosed embodiments of the casting cup assembly is the reduction of edge defects by minimizing the de-centering and tilting of the concave and convex mold surface surfaces of a casting cup assembly.

In one exemplary embodiment, a casting cup assembly is disclosed. The casting cup assembly comprises a frontcurve mold with a concave mold surface circumscribed by a ring. The assembly further comprises a basecurve mold with a convex mold surface and a second ring. When the frontcurve mold is mated with the basecurve mold, edges of the respective rings mate and minimize the de-centering and tilting of the mold surfaces.

In another exemplary embodiment, a casting cup assembly is disclosed. The casting cup assembly comprises frontcurve mold with a concave mold surface circumscribed by a ring. The assembly further comprises a basecurve mold with a convex mold surface and a second ring. The basecurve has a textured surface that is continuous with the convex mold surface. The textured surface is between the base of the convex mold surface and the second ring. When the frontcurve mold is mated with the basecurve mold, edges of the respective rings mate.

In another exemplary embodiment, a method of forming a casting cup assembly is disclosed. The method includes the step of precision lathing a casting cup assembly.

BRIEF DESCRIPTION OF THE DRAWINGS

The present invention is disclosed with reference to the accompanying drawings, wherein:

FIG. 6 is a profile view of a select portion of a frontcurve mold showing first and second continuous rings while

Corresponding reference characters indicate corresponding parts throughout the several views. The examples set out herein illustrate several embodiments of the invention but should not be construed as limiting the scope of the invention in any manner.

DETAILED DESCRIPTION

Figure 1A:
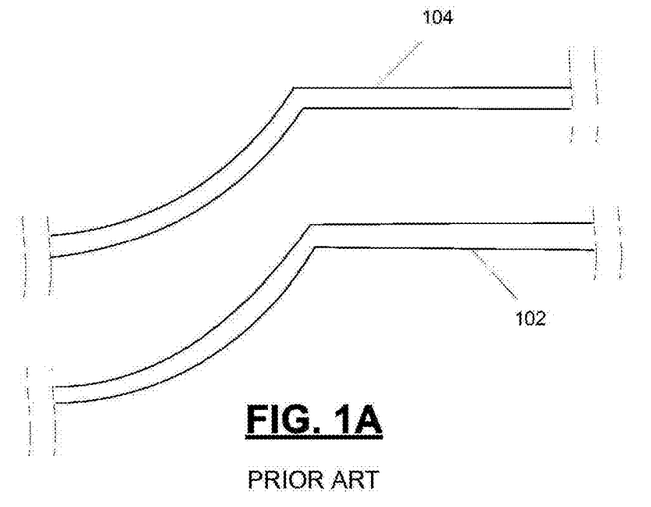
FIGS. 1A and 1B are profile views of select portions of a prior art casting cup assembly shown in an unassembled and assembled state, respectively.
Figure 1B:
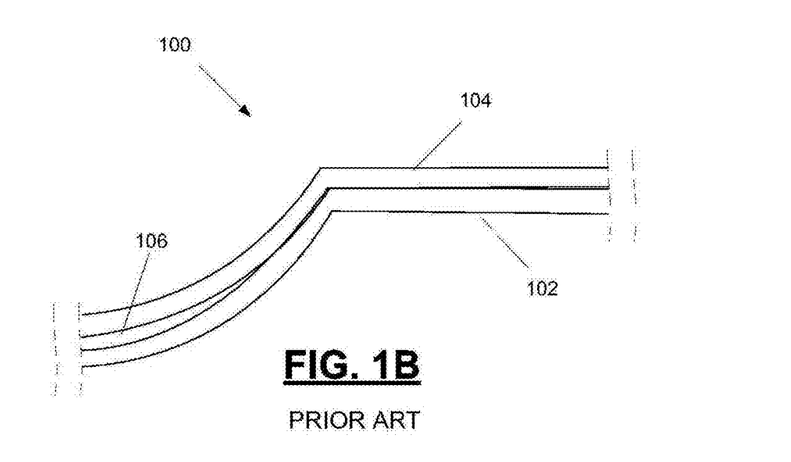

Some of the factors that impact the occurrence of edge defects in ophthalmic devices include the relative de-centering and/or tilting of the basecurve mold and the frontcurve mold in which the devices are cured. Referring to FIGS. 1A and 1B, a prior art casting cup assembly 100 is shown. Casting cup assembly 100 includes frontcurve mold 102 and basecurve mold 104 that mate to define a volume 106. An ophthalmic device is cured within this volume 106. In practice, these mold pieces are often not properly centered and/or become tilted.

Figure 2A:
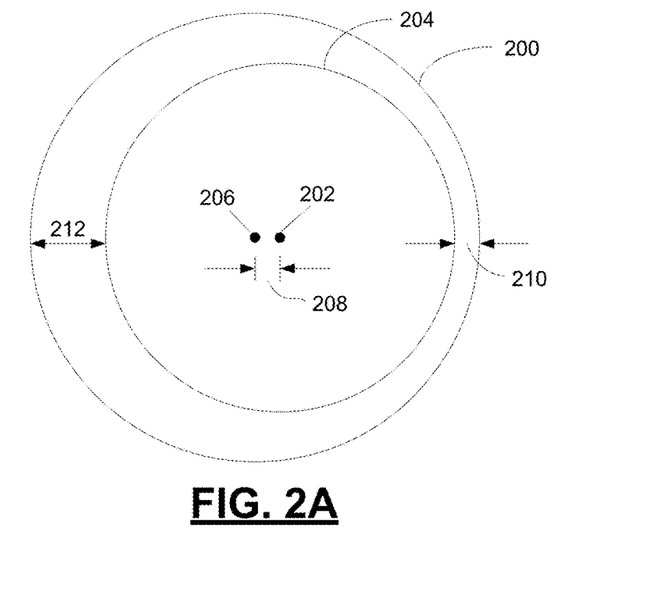
FIG. 2A is a top view of a casting cup assembly showing the eccentricity between the frontcurve and basecurve molds and FIG. 2B is a cross-sectional view of a casting cup assembly.
Figure 2B:
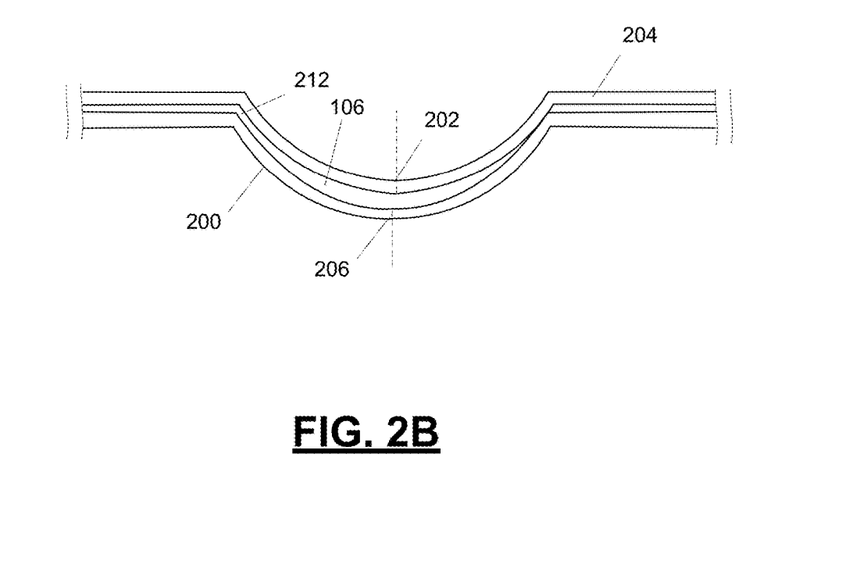

FIG. 2A provides a schematic top-view that depicts de-centering of a convex mold 204 (centered about point 202) disposed within a concave mold 200 (centered about point 206). In FIG. 2A, the center points are offset by eccentricity 208, resulting the distance 210 on one side of the mold being less than the distance 212 on the other side of the mold. After the reaction mixture is cured, the non-hydrated, but fully cured lenses, are immersed in an epoxy mixture and the epoxy cured to lock the lenses in a fixed position. The epoxy and locked lenses are subsequently sliced in half, polished, and analyzed under a microscope for defects. In those situations where the two molds were not centered, edge defects (chips, tears, rings, etc) were more common. FIG. 2B provides a cross-sectional view showing mold pieces are not properly centered. Due to the de-centering in FIG. 2B, the volume 106 is not properly sealed. See distance 212. This improper seal translates into edge defects when the resulting lens is de-molded.

Figure 2C:
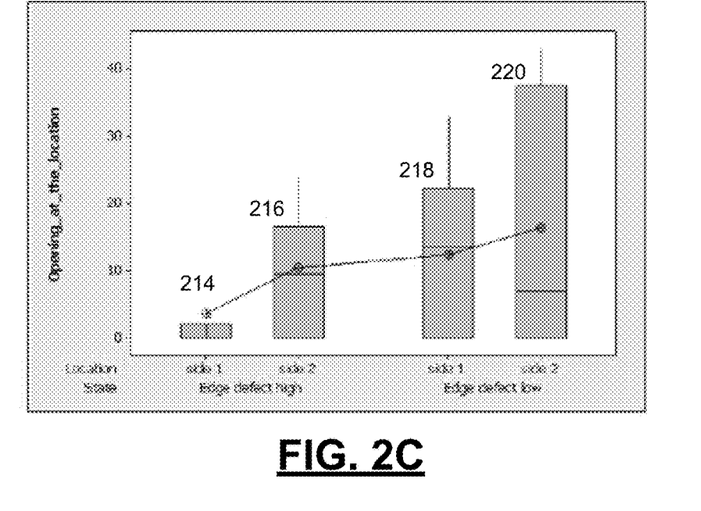
FIG. 2C is a graph correlating eccentricity to edge defects and FIG. 2D is a cross-sectional view showing tilting between frontcurve and basecurve molds.

FIG. 2C graphically depicts the results of certain de-centering experiments. The graph in FIG. 2C correlates eccentricity (in microns) to edge defects. In the first example, lenses with high edge defects were measured with respect to the distance between a first side (214) and a second side (216). In the embodiment of FIG. 2C, approximately a ten micron gap is present showing the eccentricity. In the second example, lenses with low edge defects were measured in a similar fashion (first side 218, second side 220) and approximately a five micron eccentricity is shown. Without wishing to be bound to any particular theory, applicants believe the low eccentricity between the convex and concave mold surfaces results in reduced edge defects corresponds to those lenses where the volume between the mold surfaces is properly sealed. Applicants suggest sealing defects are caused by de-centering and/or tilting of the mold pieces.

Figure 2D:
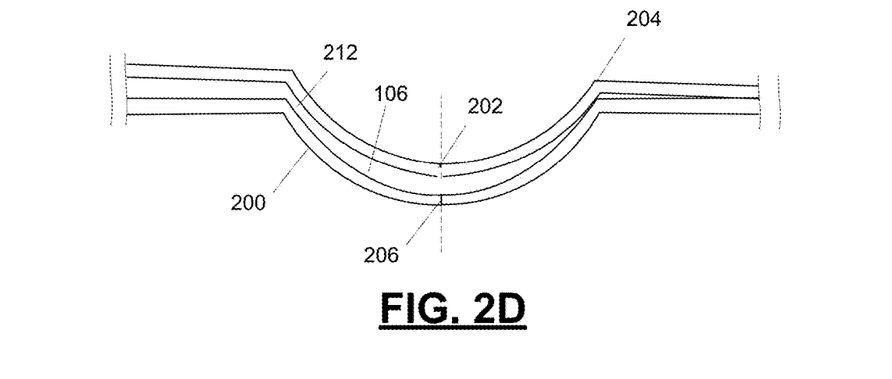

FIG. 2D provides a schematic top-view that depicts tilting of a convex mold 200 disposed within a concave mold 204. Volume 106 is not properly sealed as show by the formation of distance 212. The edge defects associated with such an improper seal are still problematic.

Figure 3A:
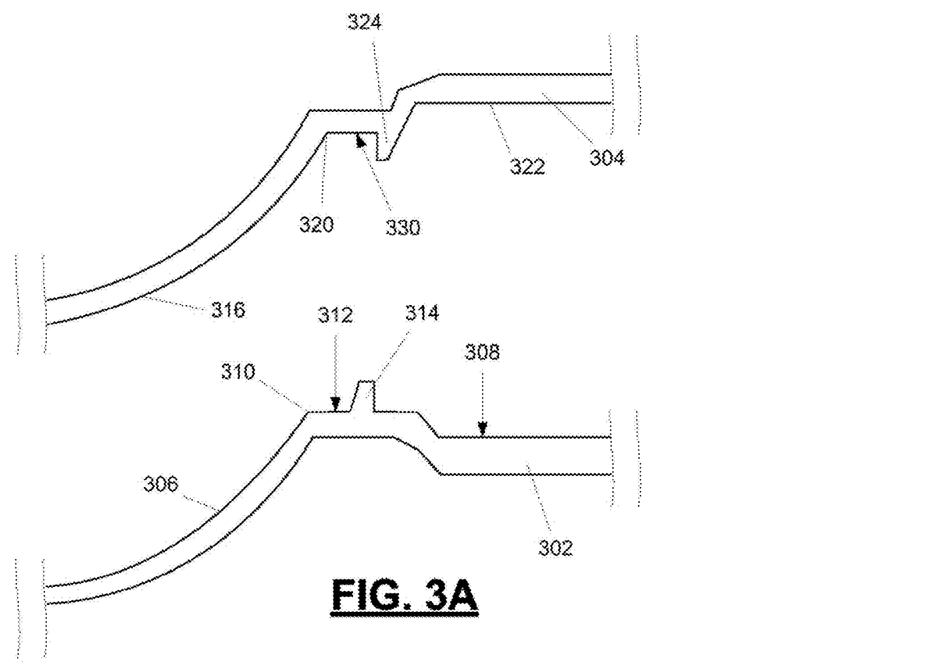
FIG. 3A and FIG. 3B are profile views of select portions of a casting cup assembly shown in an unassembled and assembled state, respectively.
Figure 3B:
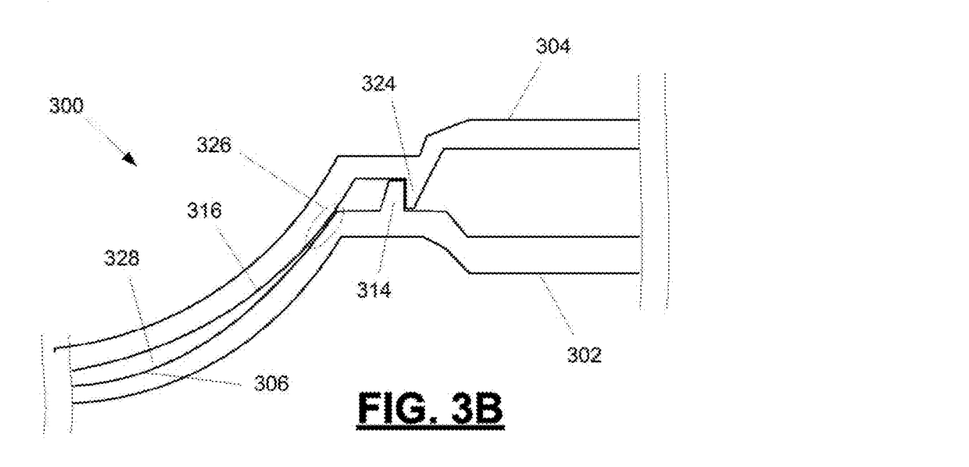

FIGS. 3A and 3B are profile views of a portion of casting cup assembly 300 shown before (FIG. 3A) and after (FIG. 3B) basecurve mold 304 is disposed on frontcurve mold 302.

Frontcurve mold 302 includes a concave mold surface 306 which forms the forward-facing portion of the ophthalmic lens. The perimeter 310 of concave mold surface 306 is sized to receive convex mold surface 316 of basecurve mold 304. Frontcurve mold 302 further includes a planar region 312 of top surface 308 that is contiguous with perimeter 310. A first ring 314 circumscribes concave mold surface 306 and extends from the top-side of planar region 312 and above perimeter 310. In one embodiment, the ring is a continuous ring. The ring is precision manufactured with respect to the knife edge of the frontcurve mold 302. First ring 314 provides the first half of an interlocking feature described in further detail below. This interlocking feature helps minimize de-centering and tilting of concave mold surface 306 and convex mold surface 316.

Basecurve mold 304 includes convex mold surface 316 which forms the portion of the ophthalmic lens that contacts an eye. The perimeter 320 of convex mold surface 316 is sized to be disposed just outside perimeter 310 when assembly 300 is formed with the adjacent planar region 330 contiguous with perimeter 320. The curvature of concave mold surface 306 and convex mold surface 316 are different such that, when basecurve mold 304 is disposed on frontcurve mold 302, a stop 326 is created which defines volume 328. The shape of volume 328 determines certain physical parameters of the resulting ophthalmic lens. Basecurve mold 304 includes a second ring 324 which, in one embodiment, is a continuous ring. The second ring is precision manufactured with respect to the axis of the basecurve mold optical surface. The second ring 324 circumscribes the convex mold surface 316 and extends from the bottom surface 322 past the perimeter 320. Second ring 324 provides the second half of the interlocking feature.

Some machinery used in the manufacturing of ophthalmic devices attempts to position the mold pieces automatically. These machines are rather complex. The interlocking feature moves this complexity away from the machinery and into the mold pieces. The resulting mold pieces are then used to fabricate ophthalmic devices with a lower frequency of defects and in a more cost effective manner. Due to the self-aligning and self-locking features provided by the interlocking feature, stop 326 is established in a reliable and homogeneous fashion such that there is little variation from one ophthalmic device to the next.

Figure 4A:
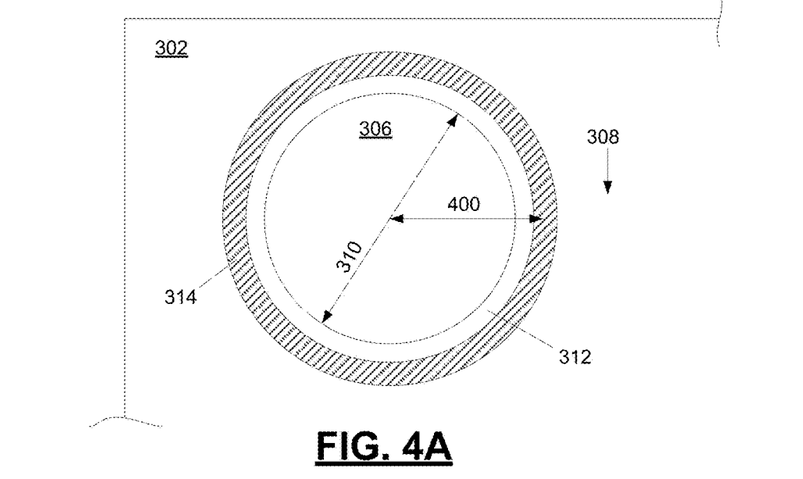
FIGS. 4A and 4B are top views of a frontcurve mold and basecurve mold, respectively.
Figure 4B:
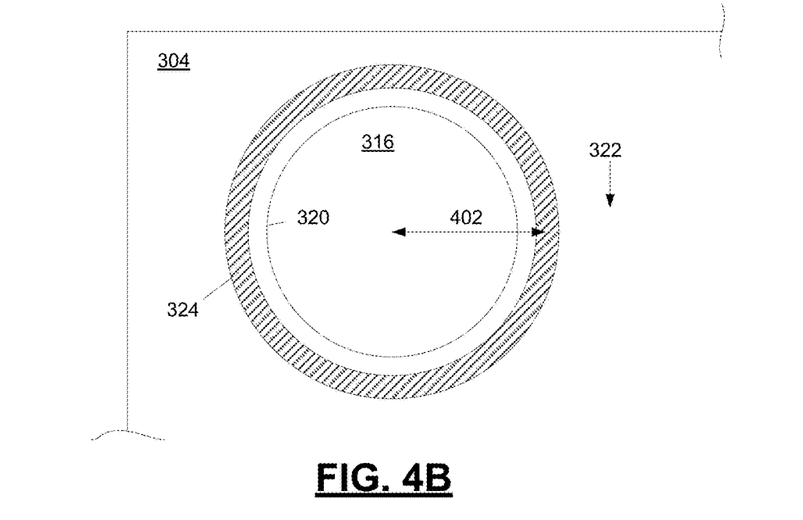
Figure 4C:
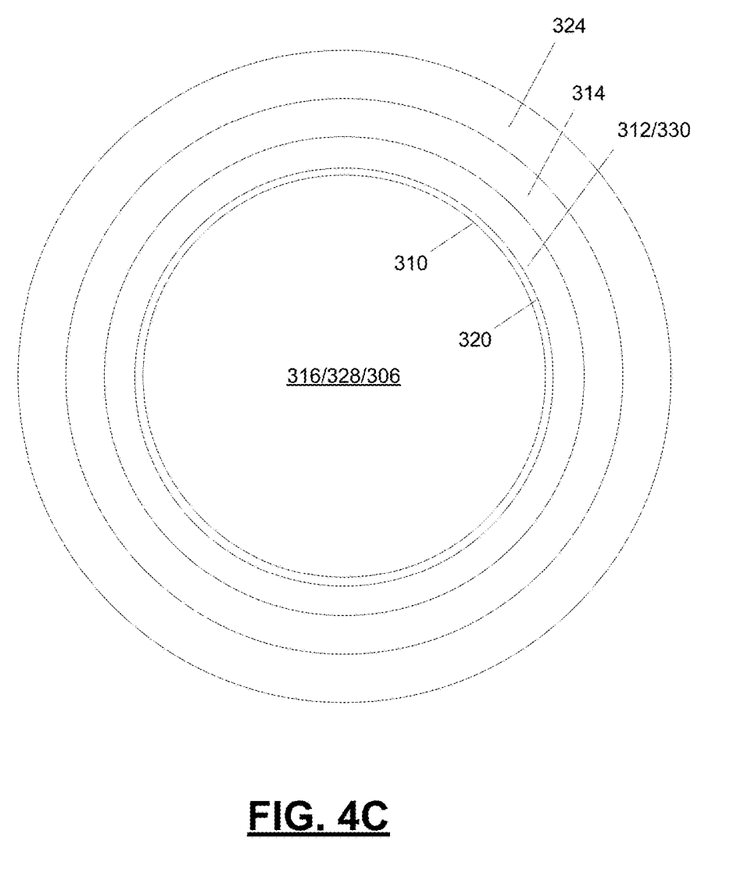
FIG. 4C is a top view of a casting cup assembly showing the alignment of a basecurve mold and a frontcurve mold.

Referring to FIGS. 4A and 4B, the radius of the two rings is shown. FIG. 4A depicts the top of frontcurve mold 302 showing a first radius 400 of the first ring 314. FIG. 4B depicts basecurve mold 304 showing a second radius 402 of the second ring 324 which, in FIG. 4B, is continuous. In another embodiment, not shown, one or both of the rings is divided into a plurality of segments separated by spaces. In the embodiment depicted in FIG. 1A and FIG. 4B, the first radius 400 of the first ring 314 is smaller than the second radius 402 of the second ring 324 which causes the first ring 314 to be inside the second ring 324 when the casting cup assembly 300 is assembled. See FIG. 4C. As shown in FIG. 4C, planar region 330 and planar top surface 312 are vertically stacked when casting cup assembly 300 is assembled. In another embodiment, not shown, the first radius 400 is larger than the second radius 402 and the second ring 324 is inside of the first ring 314 when the casting cup assembly 300 is assembled. In either embodiment, this difference in radii permits the two rings to contact each other along their edges to establish the interlocking feature. See FIGS. 5A and 5B. This interlocking feature minimizes the eccentricity between concave mold surface 306 and convex mold surface 316 thereby reducing edge defects in the resulting ophthalmic device.

Figure 5A:
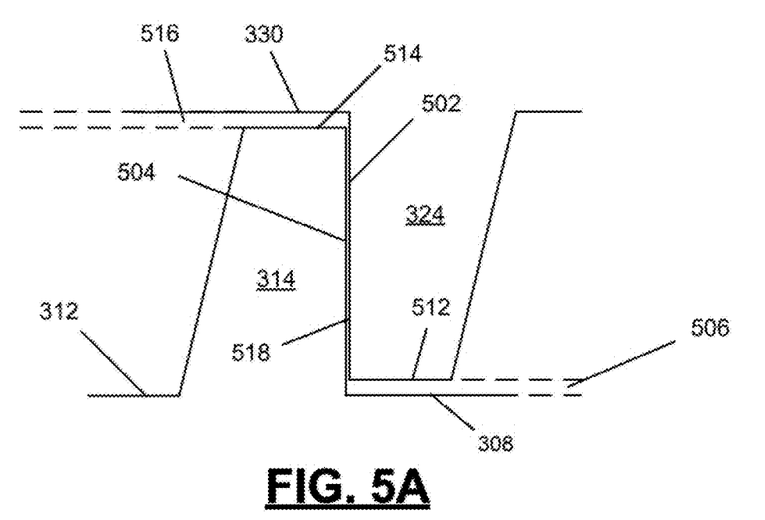
FIGS. 5A and 5B are profile views of two mated rings respectively located on a basecurve mold and a frontcurve mold.

FIG. 5A depicts an exemplary embodiment where first ring 314 is within second ring 324. First ring 314 has a first edge 504 that is configured to mate with a second edge 502 of the second ring 324. In the exemplary embodiment of FIG. 5A, the terminus of each ring (e.g. terminus 512 of second ring 324) does not contact the other ring's supporting structure (e.g. planar top surface 308) and does not function as a stop. In FIG. 5A, the terminus 512 of second ring 324 is spaced from the planar top surface 308 of the frontcurve mold 302 by a gap 506. Likewise, the terminus 514 of first ring 314 is spaced from the planar region 330 of the basecurve mold 304 by a gap 516. The mating of first edge 504 and second edge 502 forms an interference fit 518 between these two edges which prevents de-centering of concave mold surface 306 and convex mold surface 316. In one embodiment, the first ring 314 and the second ring 324 have a cylindrical shape such that first edge 504 and second edge 502 are parallel. This prevents either ring from functioning as a stop and ensuring the stop 326 is properly established at the knife edge.

When stop 326 is properly established and volume 328 is defined, the interlocking feature minimizes both de-centering and tilting. The parallel first edge 504 and second edge 502 minimize de-centering by forming the interference fit 518. Gap 506 minimizes tilting. Should one of the mold pieces begin to tilt, the gap 506 (on one side of the mold piece or the other) will contact planar top surface 308 and bottom out. The tilt, therefore, cannot exceed the gap 506. By precision manufacturing the mold pieces, the magnitude of the gap 506 can be controlled which, in turn, controls the amount of tilt that is permitted. In one embodiment, gap 506 is less than 6.5 microns.

Likewise, when stop 326 is properly established and volume 328 is defined, the interlocking feature also permits one to minimize the use of excess reaction mixture that is squeezed out of volume 328. Since the volume 328 is well defined, a more controlled volume of reaction mixture may be used. Any excess reaction mixture forms a thin film of excess monomer which is subsequently removed during post-polymerization processing. In contrast, many prior art techniques have significantly more excess monomer which requires extensive post-polymerization processing to remove.

Figure 5B:
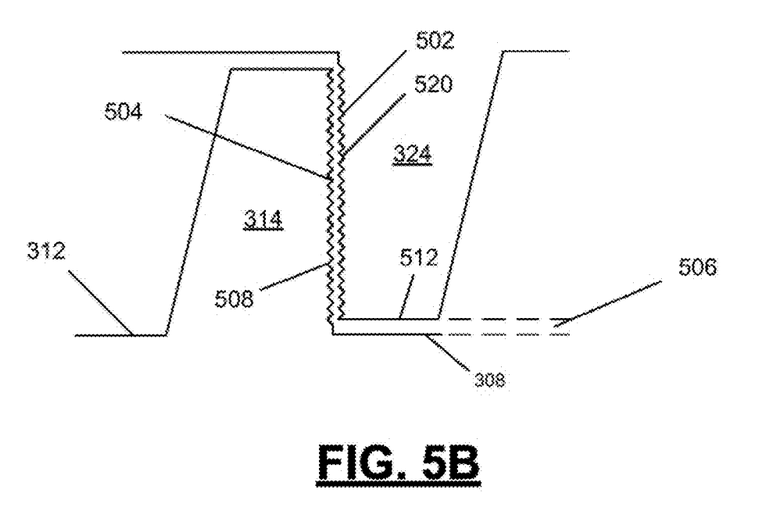

FIG. 5B depicts a second exemplary embodiment, where first edge 504 and second edge 502 have been modified to provide matching first and second grooves. In the embodiment of FIG. 5B, first ring 314 has first grooves 508 and second ring 324 has second grooves 520. The protrusions on the first grooves 508 moves against the protrusions on the second grooves 520 and provides a locking mechanism similar to a ratchet. Such an interlocking feature provides a finite number of locking positions. In FIG. 5B, first grooves 508 and second groves 520 both include a plurality of tracks In other embodiments, first grooves 508 or second grooves 520 have a single protrusion that mate with the corresponding grooves on the opposing ring. The grooves may be formed by, for example, increasing the feed-rate on the lathe that forms the respective mold. This permits a small pitch to be formed.

By providing an interlocking feature that circumscribes the concave mold surface 306 and the convex mold surface 316 the eccentricity between these surfaces can be minimized. The edge defects that are associated with such eccentricity is therefore reduced. In one embodiment, the eccentricity is less than about thirty microns. In another embodiment, the eccentricity is less than about fifteen microns. In yet another embodiment, the eccentricity is less than about five microns. Additionally, the interlocking feature also prevents tilting by maintaining the frontcurve mold 302 and the basecurve mold 304 in a parallel orientation which further reduces defects. In one embodiment, the two molds are parallel within about ten degrees. In another embodiment, the two molds are parallel within about five degrees. In another embodiment, the two molds are parallel within about three degrees. In yet another embodiment, the two molds are parallel within about one degree.

Figure 6:
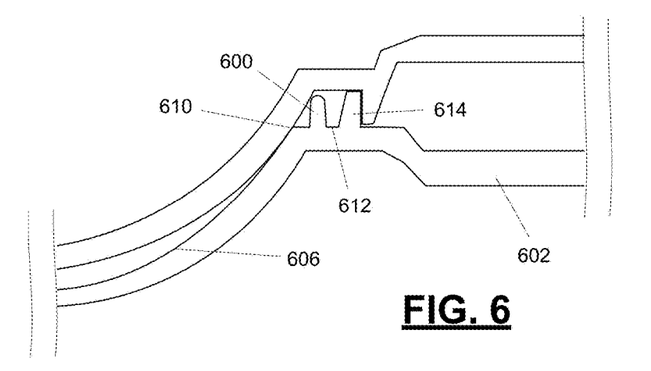

FIG. 6 is a profile view of a section of frontcurve mold 602 that includes concave mold surface 606 with perimeter 610. A top planar surface 612 is also shown that has a first ring 614 circumscribing concave mold surface 606 that extends from planar top surface 612 and above perimeter 610. Frontcurve mold 602 further comprises a second continuous ring 600 that functions as a barrier to contain the reaction mixture disposed within concave mold surface 606. When the basecurve mold is mated to frontcurve mold 302, the volume of the reaction mixture is restricted and excess fluid is pressed against second continuous ring 600. The presence of second continuous ring 600 helps control the formation of ring defects in the resulting ophthalmic lens by restriction the flow of the reaction mixture. In one embodiment, second continuous ring 600 abuts a surface of the corresponding basecurve mold that has been modified to permit second continuous ring 600 to adhere to the basecurve mold. This surface may be modified (e.g. rings, surface roughening, surface energy modification, etc) to cause the second continuous ring 600 to stick to the basecurve mold at demold.

Figure 7:
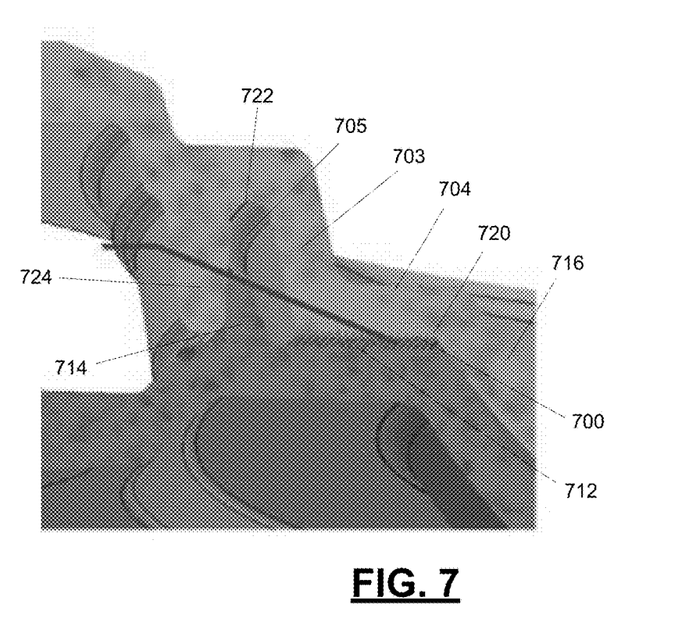
FIG. 7 is a profile view of a selection portion of a frontcurve and basecurve mold wherein the basecurve mold includes a textured surface.

FIG. 7 is a profile view of another exemplary assembly. Basecurve mold 704 of FIG. 7 includes a textured surface 700 disposed between the perimeter 720 of convex mold surface 716 and the bottom surface 722, from which second ring 724 extends. Textured surface 700 is joined to bottom surface 722 by vertical spacer 703 which provides a space 705 for first ring 714 to reside. Textured surface 700 provides a large surface area which promotes the adhesion of polymerized material. Textured surface 700 is vertically stacked above top planar surface 712, which provides a smooth surface that promotes the release of polymerized material. When the reaction mixture is cured and the frontcurve and basecurve molds are separated, the excess polymeric ring tends to adhere to the textured surface 700 and be separated from the cured ophthalmic lens. The removal of the ring of excess polymer by its adhesion to textured surface 700 helps further minimize the occurrence of edge defects.

The molds may be formed by, for example, precision lathing techniques such as diamond-point turning. In one embodiment, the rings of the interlocking feature are formed by diamond-point-turning in the same tooling step (i.e. the molds are not removed from the lathe during the process) as the formation of the optical surface of the convex and concave mold surfaces. This ensures accurate concentricity of the locking feature with respect to the axis and orthogonal plane of the respective mold surface. In one embodiment, the optical surface of the mold piece, as well as the associate ring that forms the interlocking feature, are both precision manufactured in a single pass. For example, a single pass with a lath may form both the optical surface and the interlocking feature.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the appended claims.

What is claimed is:

1. A method for forming a casting cup assembly comprising the steps of:
   precision lathing a frontcurve mold with a lathe, the frontcurve mold comprising a concave mold surface on an inwardly-facing top-side of the frontcurve mold, the concave mold surface having a curved surface that is surrounded by, and contiguous with, a planar region of a top surface;
   precision lathing a first continuous ring in the frontcurve mold during the step of precision lathing the frontcurve mold such that the first continuous ring circumscribes the concave mold surface and extends inwardly from the planar top surface region and beyond the curved surface, the planar top surface region being within the first continuous ring, wherein the step of lathing the frontcurve mold and the step of lathing the first continuous ring are performed without removing the frontcurve mold from the lathe;
   precision lathing a basecurve mold with the lathe, the basecurve mold comprising a convex mold surface on an inwardly-facing bottom-side of the basecurve mold, the convex mold surface having a perimeter that is surrounded by, and contiguous with, a planar region of a bottom surface; and
   precision lathing a second continuous ring in the basecurve mold during the step of precision lathing the basecurve mold such that the second continuous ring circumscribes the convex mold surface and extends inwardly from the bottom surface and past the perimeter, the planar bottom surface region being within the second continuous ring, wherein the step of lathing the basecurve mold and the step of lathing the second ring are performed without removing the basecurve mold from the lathe.

2. The method as recited in claim 1, wherein the steps of precision lathing the frontcurve mold and precision lathing the first continuous ring are performed by diamond-point turning.

3. The method of claim 1, wherein the concave mold surface has a different curvature from the convex mold surface.

4. The method of claim 1, wherein the first continuous ring and the second continuous ring are configured to mate when the basecurve mold is disposed on the frontcurve mold.

5. The method of claim 4, wherein the first continuous ring has an internal side surface defined by a first internal radius and an external side surface defined by a first external radius and the second continuous ring has an internal side surface defined by a second internal radius and an external side surface defined by a second external radius, and wherein the first external radius and the second internal radius are configured such that the external side surface of the first continuous ring engages the internal side surface of the second continuous ring when the basecurve mold is disposed on the frontcurve mold.

6. The method of claim 1, wherein the first continuous ring has a first radius and the second continuous ring has a second radius, the first and the second radii being different and configured to mate such that an edge of the first continuous ring contacts an edge of the second continuous ring when the basecurve mold is disposed on the frontcurve mold.

\* \* \* \* \*